United States Patent [19]
Koenigsberg et al.

[11] Patent Number: 5,264,018
[45] Date of Patent: Nov. 23, 1993

[54] USE OF METALLIC PEROXIDES IN BIORMEDIATION

[75] Inventors: Stephen Koenigsberg; William A. Farone, both of Irvine, Calif.

[73] Assignee: Plant Research Laboratories Inc., Corona del Mar, Calif.

[21] Appl. No.: 981,981

[22] Filed: Nov. 24, 1992

Related U.S. Application Data

[63] Continuation of Ser. No. 719,340, Jun. 21, 1991, abandoned, which is a continuation-in-part of Ser. No. 455,165, Dec. 22, 1989, abandoned, which is a continuation-in-part of Ser. No. 7,573, Jan. 28, 1987, Pat. No. 4,791,824.

[51] Int. Cl.$^5$ .................................................. C05G 3/00
[52] U.S. Cl. .............................................. 71/63; 71/11; 71/27; 71/34; 71/64.1; 71/64.11; 71/903; 71/904; 435/262.5; 47/57.6
[58] Field of Search ................ 71/34, 1, 11, 27, 64.10, 71/64.11, 63; 435/262.5, 262

[56] References Cited

U.S. PATENT DOCUMENTS

| | | | |
|---|---|---|---|
| 2,165,428 | 9/1936 | Waugh | 502/241 |
| 3,796,637 | 3/1974 | Fusey | 502/401 |
| 3,843,517 | 10/1974 | McKinney et al. | 210/611 |
| 3,912,490 | 10/1975 | Boghosian | 71/28 |
| 4,155,738 | 5/1979 | Boghosian | 71/25 |
| 4,171,968 | 10/1979 | Farone | 504/313 |
| 4,293,426 | 10/1981 | Gago | 210/759 |
| 4,326,035 | 4/1982 | Gabellieri | 435/247 |
| 4,399,633 | 8/1983 | Haughey et al. | 423/583 |
| 4,410,350 | 10/1983 | Judd | 71/63 |
| 4,414,333 | 11/1983 | Olivieri et al. | 435/243 |
| 4,470,839 | 9/1984 | Gago | 71/34 |
| 4,529,702 | 7/1985 | Bryan | 435/253.6 |
| 4,568,373 | 2/1986 | Yasuhara et al. | 71/6 |
| 4,834,957 | 5/1989 | Van de Walle | 423/268 |

FOREIGN PATENT DOCUMENTS

| | | |
|---|---|---|
| 0063844 | 11/1982 | European Pat. Off. |
| 0181210 | 5/1986 | European Pat. Off. |
| 0181211 | 5/1986 | European Pat. Off. |
| 3031485 | 8/1980 | Fed. Rep. of Germany |
| 49-117244 | 11/1974 | Japan |
| 5333869 | 9/1976 | Japan |
| 6148495 | 8/1984 | Japan |
| 9109821 | 7/1991 | PCT Int'l Appl. |

OTHER PUBLICATIONS

Z. Yang et al., "System for Simultaneous Study of Bacterial and Plant Geen Expression in Soft Rot of Potato", Molecular Plant-Microbe Interactions, vol. 2, No. 4: 195–201 (1989).

"Mighty Microbes", Chemical Engineering, Mar. 1991, pp. 30–35.

Madsen, et al., "In Situ Biodegradatoin: Micorbiological Patterns in a Contaminated Aquifer" Section of Microbiology, Science Biol. Vo. 252, May 1991.

Travis, M. D., et al., "Bioremediation of Petroleum Spills in Arctic and Subarctic Environments" Jul. 1990.

Hinchee, R. E., et al., "Enhanced Bioreclamation o Jet Fuels: A Full-Scale Test at Eglin AFB, Fla." Sep. 1989.

Huling, S. G., et al., "Enhanced Bioremediation Utilizing Peroxide as a Supplemental Source of Oxygen: A Laboratory and Field Study" Feb. 1990.

Tabak H. H., et al., "Laboratory Studies Evaluating the Enhanced Biodegradation of Weathered Crude Oil Components through the Application of Nutrients", Jun. 1990.

Powell, R. M., et al., "Comparison of Methods to Determine Oxygen Demand for Bioremediation of a Fuel Contaminated Aquifer" Sep. 1988.

(List continued on next page.)

Primary Examiner—Ferris Lander
Attorney, Agent, or Firm—Knobbe Martens Olson & Bear

[57] ABSTRACT

Disclosed is a method of decontaminating soil by applying to the soil an oxygen delivery vehicle such as peroxides of calcium, potassium or magnesium or mixture thereof in an amount which substantially increases the population of microorganism in the soil that digest pollutants. Preferably, a surfactant and an oxygen release rate modifier are also included.

34 Claims, 7 Drawing Sheets

OTHER PUBLICATIONS

Britton, L. N., et al., "Aerobic Denitrification as an Innovative Method for in situ Biological Remediation of Contaminated Subsurface Sites", Jan. 1989.

Charles P. Gerba, et al., "Microbial removal and inactivation from water by filters containing manesium peroxide", J. Environ. Sci. Health, 1988.

Christiansen, M. L., et al., "Nitrogen Utilization and Digestibility of Amino Acids by Lambs Fed a High-Concentrate Diet with Limestone or Magnesium Oxide", J. Anim. Sci. 68(7), 1990, 2095-2104.

Van Ravenswaay, R. O., et al., "Comparison of Methods to Determine Relative Bioavailability of Magnesium in Magnesium Oxides for Ruminants", J. Dairy Sci., 72 (11), 1989, 2968-2980.

Gerba, C. P., et al., "Microbial Removal and Inactivation from Water by Filters Containing Magnesium Peroxide", J. Environ. Scie Health Prt A Environ Sci Eng 23(1) 1988 41-58.

Bourrelly, P., et al., "Freshwater Algae Sampled by F. Starmuelhners Mission in New-Caledonia in 1965 Excluding Diatoms 2,. Chlorophyceae Desmidiaceae and Charophyceae", Rev Hydrobiol Trop 17(2) 1984. 101-116.

Bourrelly, P., et al., "Fresh-Water Algae Collected by F. Starmuhlners Expedition in New-Caledonia in 1965 Excluding Diatoms", Rev Hydrobiol Trop 17(1) 1984, 13-85.

Watlington, Percy M., et al., Interbureau By-Lines, vol. 4, No. 4, Jan. 1968.

FIG. 5  LEVELS OF ORC IN TREATMENT

USE OF METALLIC PEROXIDES IN BIORMEDIATION

This application is a continuation of application Ser. No. 719,340, filed Jun. 21, 1991, and now abandoned which is a continuation-in-part of copending application Ser. No. 455,165, filed Dec. 22, 1989, and now abandoned entitled "Metallic Peroxides as Supplements for Plants, " and a C-I-P of 07/007,573, filed on Jan. 28, 1987, now U.S. Pat. No. 4,791,824, issued on Dec. 20, 1988 and of PCT Application No. PCT/US90/07573, filed Dec. 20, 1990, now WO91/0982 "Peroxides with Enzyme Active Metals as Supplements for Plants."

BACKGROUND OF THE INVENTION

This invention relates to the use of oxygenation compounds, and mixtures of these oxygenation compounds with phosphates or surfactants, or both, as agents which foster the growth of soil microorganisms that digest pollutants in the soil. In particular, this invention relates to the use of certain metal peroxides or metal peroxide/phosphate/surfactant mixtures (oxygen releasing compounds, or "ORCs") by directly applying the ORC to the soil or blending the ORC with plant nutrients, or other beneficial additives, or both, and then applying to the soil.

Wildlife, water quality and human safety are all threatened by the presence of certain waste chemicals in soil and water supplies. These chemicals are capable of persisting in the environment undisturbed for long periods of time and can be classified as environmental pollutants. Investigators have looked to the degradative capacity of microorganisms in order to harness the ability of some bacteria, fungi and protozoa to break down waste compounds. Typically, such waste compounds are organic chemicals such as hydrocarbons or halocarbons. However, the definition also extends to inorganics including certain toxic ions such as heavy metals and radioisotopes.

Bioremediation refers broadly to the use of microbiological populations to participate in the biodegradation, transformation or sequestration of a given environmental pollutant. In situ biodegradation by microorganisms has been documented in field studies of ponds and soil (J.C. Spain, et al. Appl. Environ. Microbiol., 48:944. 1984), in which bacteria are used to break down organic compounds into carbon dioxide and water. Other soil decontamination procedures include soil washing and thermal treatment. These techniques are only partially satisfactory as some merely relocate the contaminant to an alternative site and others convert the pollutant to another undesirable form. In bioremediation, the organisms use the materials as a food source and convert them into useful or innocuous metabolites. Sometimes they sequester materials, e.g., heavy metals, that can actually be recovered for economic benefit.

Organisms that are native or foreign to a particular contaminated site can be employed in the bioremediation process; however, each individual contaminated location has soil compositions that are unique to that site. Populations of organisms evolve based on the selective pressures they receive from their surroundings. Thus, organisms native to a given location may be better adapted to survival in that location, or may have the genetic ability to metabolize an existing pollutant, and may therefore be better candidates to assist in biodegradation.

To date, aerobes, those organisms requiring oxygen for growth, are more frequently used for biodegradation than anaerobes. For some pollutants, however, bioremediation may be accomplished by anaerobes or sequential anaerobic-aerobic use cycles. Since an important aspect of bioremediation is to provide nutritional and environmental support to promote the growth of the appropriate bacteria and other organisms that can degrade the contaminant, oxygen, inorganic nutrients and other beneficial additives are added to the soil, through a variety of means, to increase the activity of the microbe population in an aerobic process.

Current technology often includes the excavation and relocation of contaminated soil (termed off site bioremediation) or excavation and treatment without relocation. The excavated soil is periodically turned over to ensure good aeration, if permitted by applicable air quality regulations, and the soil may be periodically moistened with water and supplemented with nutrients and other additives that promote bacterial growth. Air distribution systems can alternately be plumbed into the ground to oxygenate the soil; however, this can be impractical in high density media and may also be regulated by air quality standards.

Bioreactors have also been employed for biodegradation. In one form of bioreactor, soil is placed into a containment vessel which is rotated to maintain loose, aerated soil. This process has the disadvantage that it can be slow and expensive. Temperature, oxygen and nutrients are all controlled as needed. Off site techniques promote biodegradation but can be costly and time consuming. Soil must be transported to a site where it undergoes treatment for up to several years or more. While soil removal may be a necessity for gross contamination, some sites are too large to relocate.

There are several proposed methods for on site biodegradation. These often involve infiltrating the soil. Sometimes wells are dug and ground water is pumped to the surface. The water is purified, phosphates, nitrates and other nutrients are added, and the water is pumped through the soil.

U.S. Pat. No. 3,796,637 to Fusey states that the use of compositions of 10 to 40% by weight of iron oxide, manganese dioxide, zinc oxide or an alkali metal peroxide (monovalent series, e.g., sodium peroxide or potassium peroxide from group IA of the Periodic Table), promotes the biological degradation of hydrocarbon-containing waste material. The substances are said to promote biological degradation and to reduce the odors associated with anaerobic fermentation. While these compounds are stated in Fusey's examples to be useful for liquid-based biodegradation, it is not clear if they could be practical in promoting biodegradation in soil.

The addition of elemental oxygen, hydrogen peroxide, nitrate and surfactant are currently being tested to determine whether the addition of various combinations of these ingredients promote hydrocarbon degradation in the soil (Fouhy, K., et al. *Chem. Engineer.* March, 1991, pp. 30–35). L. Freidrich of Triachler (Darmstadt, Germany) indicated that hydrogen peroxide seems to be the most effective. Neither is admitted to be prior art by citation herein. The use of nitrates is disadvantageous because nitrate is a pollutant, and is not as efficient in delivering oxygen as the compounds disclosed herein.

There are a number of problems associated with the use of hydrogen peroxide in the soil either alone or in combination with fertilizers. Hydrogen peroxide is relatively unstable. In particular, formulations of hydrogen peroxide in combination with some metals can result in spontaneous combustion with increased temperatures. For example, the presence of $Fe^{+2}$, a common ingredient in fertilizer mixtures, whether by design or trace contamination, can result in rapid destabilization of hydrogen peroxide.

Further, the average lifetime of hydrogen peroxide in the soil can be as little as several hours, depending on the soil conditions and the catalytic properties of its constituents. Thus, $H_2O_2$ may not even survive long enough to make it to the desired treatment site. Hydrogen peroxide decomposition also results in the production of oxygen free radicals that are toxic to those same microorganisms whose growth is required for bioremediation.

Thus, repeated applications of relatively low hydrogen peroxide concentrations are required to foster bacterial growth without undue toxicity. Since the time required for bioremediation is proportional to the rate of bacterial replication and enzymatic activity, hydrogen peroxide based soil oxygenation still results in a lengthy, expensive and potentially hazardous biodegradation process.

Notwithstanding the foregoing, there remains a need for a method of enhancing in situ, excavated on site, or off site bioremediation by, stimulating either native microorganisms or innoculae or both, which provides for safe and effective time-release delivery of oxygen and other nutrients or other additives to a sufficient depth in a soil media.

SUMMARY OF THE INVENTION

There has been provided in accordance with one aspect of the present invention, a method of treating soil contaminated with pollutants of the type which are treatable by microorganisms either native in or added to the soil. The method comprises application to the soil of a composition containing an oxygen delivery vehicle such as magnesium peroxide, calcium peroxide, potassium peroxide or mixtures thereof in an amount effective to substantially increase the pollutant treating activity of the population of microorganisms in the soil.

Preferably, the compound further comprises an oxygen release rate modifier for controlling the rate of liberation of oxygen from said compound. The release rate modifier is preferably a source of phosphate ion. The source of phosphate ion is optimally introduced into the aqueous phase during preparation of the metal peroxide to achieve intercalation.

In accordance with another embodiment of the present invention, the composition additionally comprises a surfactant of the type which will not significantly deleteriously affect the microbial population of interest, and which will not significantly expand or disperse the toxic plume. The composition may additionally comprise a blend of macronutrients, micronutrients, or other beneficial additives for supplementing the environment of the desired microorganism.

In accordance with a further aspect of the present invention, there is provided a method for enhancing the biological treatment of waste materials from a site containing such waste materials, comprising the steps of identifying a site containing waste materials to be removed, and shifting the reduction oxidation potential of the soil or other media at that site in the positive direction. Preferably, the reduction oxidation potential is shifted to a value which is greater than zero.

The reduction oxidation potential is preferably shifted in the positive direction by the application of an oxygen delivery source, comprising a metal peroxide or mixtures of metal peroxides preferably in combination with an oxygen delivery rate modifier and/or surfactant. Alternatively, the reduction oxidation potential of the soil or other media may be shifted in the positive direction by adjustment of the pH or temperature of the soil or media.

These and further features and advantages of the present invention will become apparent to one of skill in the art based upon the detailed description of preferred embodiments which follows, when considered together with the attached drawings and claims.

DETAILED DESCRIPTION OF PREFERRED EMBODIMENTS

Figure 1:
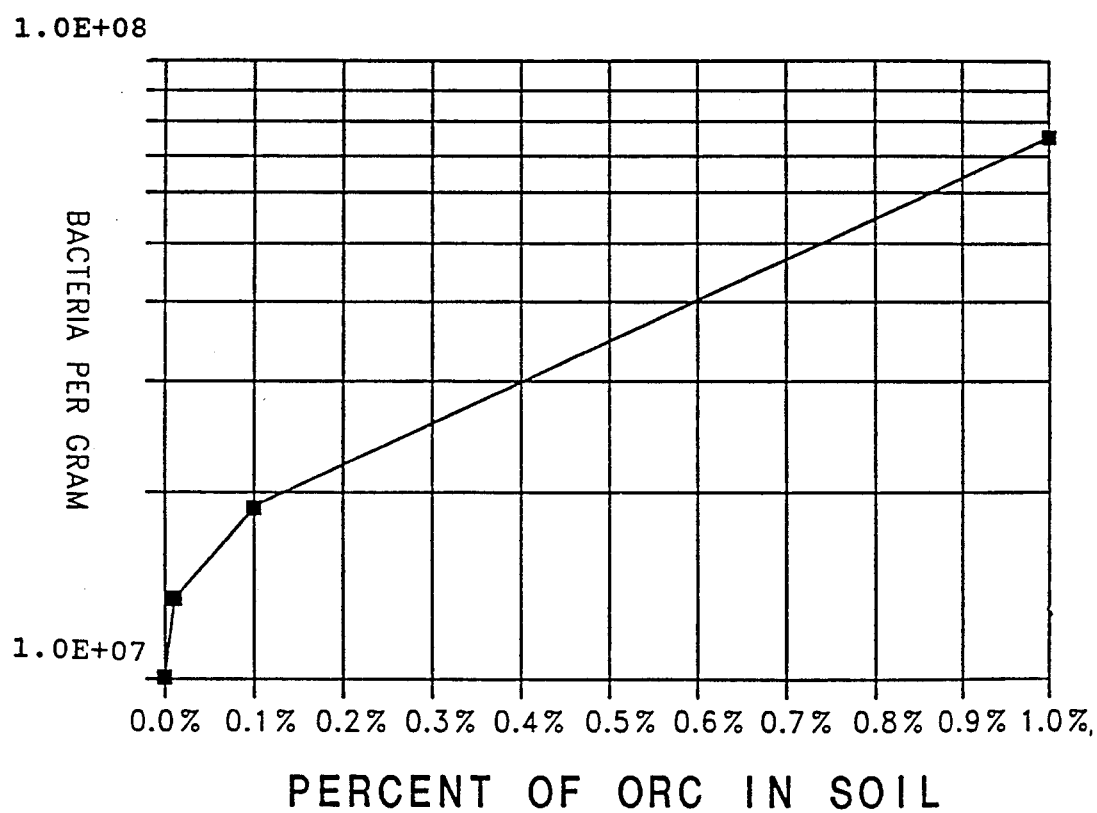
FIG. 1 is a semi-log plot illustrating effect of varying dosages of ORC on bacterial count in a soil sample, in accordance with Example 9.

Soil contaminated with pollutants, such as, but not limited to, hydrocarbons or halocarbons is decontaminated in accordance with the present invention by microorganisms in the soil which digest these pollutants. In general these microorganisms are aerobic, and therefore they require oxygen to support their growth.

The particular types of microorganisms which will be responsible for waste degradation at a given bioremediation location cannot be stated with precision. However, a variety of candidate organisms have been identified in the soil. These include the genera Acetobacter, Acetomonas, Arthrobacter, Brevibacterium, Corynebacterium, Hydrogenomonas, Micrococcus, Micobacterium, Nocardia, Pseudomonas, Streptomyces, Vibrio Xanthobacter and the like. Certain microorganisms that may be particularly useful for the degradation of hydrocarbons associated with pollution that could additionally be found in the soil, and could thus be active in biodegradation, include: *Pseudomonas aeruginosa, Pseudomonas boreopolis, Pseudomonas fluorescens, Pseudomonas syringal, Pseudomonas natriegens, Pseudomonas oleovorans, Methanomonas methanica, Desulfovibrio desulfuricans, Micrococcus paraffinae, Achromobacter agile, Achromobacter centropunctatum, Bacterium aliphaticum, Bacterium benzoli, Bacterium hidium, Bacterium naphtha linicus, Bacillumlus hexacarbovoram, Bacillus tolulicum, Mycabacterium album, Mycobacterium rubrum, Mycobacterium lacticola, Actinomyces*

*oligocarbophilus, Vandida pulchemie, Candid utiliz, Vandida tropicalix* and *Vandida lipolytica.*

Two known bacteria that are beneficial to soil and may be desirably added during the bioremediation process include Pseudomonas fluorescens and Bacillus popilliae. Beneficial fungi present in the soil include but are not limited to the following genera: Phanerochaete, Pisolithus, Boletus, Cenococum and Thelephora. Beneficial algae include Trichosphaerium 1-7. Any bacteria, fungi and protozoa present in the soil, that have evolved in situ to meet the biodegradative demands imposed on them could be useful for bioremediation. Thus the organisms provided above serve only as exemplary candidates for bioremediation.

The present invention discloses the use of oxygen delivery vehicles such as calcium, potassium or magnesium peroxides, or mixtures thereof, preferably magnesium peroxide, in a time release formulation to oxygenate contaminated soil and support prolonged aerobic microbial growth for bioremediation. The increased rate of bacterial or other microbial population growth or activity reduces the time required for biodegradation.

The present invention also provides a method for delivering oxygen to a treatment site below the ground comprising the application to or near the surface of the ground a metal peroxide or mixtures thereof of an appropriate mesh size, and optionally a surfactant or time release capability, to facilitate infiltration of the peroxide into the soil. The solid particles when properly sized can be carried to a second depth in the water phase. In addition, the solid particles assist in preventing the treatment from migrating away from the treatment site. The released oxygen is thereafter carried to a further depth in the water phase by percolation, which can be enhanced by the surfactant, which preferably can degrade into harmless byproducts and will not spread the waste plume.

The present invention is based on the discovery that a variety of appropriately selected oxygen release compounds when applied at effective levels, either alone or in a fertilizer formulation, with or without other beneficial amendments, increase the growth or activity of microorganisms which digest soil pollutants and reduce the level of these pollutants in the soil. These microorganisms may be present as naturally occurring in the soil or the soil may be inoculated with specialized microorganism. The method of applying the ORCs may be in accordance with conventional techniques such as, for example, by blending with excavated soil, augured directly into soil, injected into fractures in soil substrates, or deposited in trenches surrounding sealed contaminated soil areas.

The basis of the bioremediation enhancing actions of ORCs is believed by the inventors herein to involve, inter alia, their ability to release oxygen within certain parameters discussed below. Although the complex chemical reactions of the soil environment are beyond description using the current state of the art, the empirical evidence developed by the inventors leads them to conclude that the oxygen release characteristics of the compounds and formulations disclosed herein, have beneficial effects in the enhancement of contaminant controlling microorganisms.

A central parameter in soil chemistry is the reduction-oxidation potential. The so-called "redox" potential is an electrochemical background condition, which controls the chemical reactivity of ions in soil. The present invention is directed to making negative redox potential medias "less negative," or slightly positive redox potential medias "more positive." Thus, as used herein, references to moving the redox potential from negative to positive refers to the direction of the change, not necessarily a change from absolute negative (below zero) to absolute positive (above zero).

A positive redox potential, referred to as an oxidized environment, is generally beneficial to aerobic microbial activity. Conversely, soils tending to have a negative redox potential suppress aerobic microorganism activity. The common terms, sweet and sour soil, relate respectively to the above descriptions and the characteristic smells are a function of the different chemistry in each condition. ORCs, by virtue of their oxygen release capability, tend to provide an initial increase in the redox potential in the positive direction.

Although the delivery of oxygen is important to the efficacy of the methods of the present invention, it is also important to note that too fast an oxygen liberation rate, or too high a redox potential, can be detrimental to the desired microorganism growth.

The redox potential is a function, not only of the charged species, but also of the concentration of the species and the temperature of the solution. For the case of reactions which involve oxygen in solution, the two important "half reactions" (written as "standard" potentials for unit concentration at 25° C.) are:

acidic solution

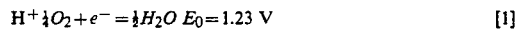

$$H^+ + \tfrac{1}{2}O_2 + e^- = \tfrac{1}{2}H_2O \quad E_0 = 1.23 \ V \tag{1}$$

basic solution

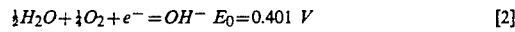

$$\tfrac{1}{2}H_2O + \tfrac{1}{2}O_2 + e^- = OH^- \quad E_0 = 0.401 \ V \tag{2}$$

An overall reaction (which is the sum of "half reactions") proceeds to the right as written if the redox potential is positive. When one uses a redox electrode, one is measuring the tendency for electrons to be lost or gained compared to the electrode. Adding oxygen to the solution will drive the redox value up in either basic or acidic solution because the two reactions above are both positive.

The reactions also depend upon the pH of the media. Again, assuming unit concentration, for example, equation [1] has a voltage given by:

$$E = E_0 - (0.059 \ V)(pH) \tag{3}$$

Thus, with a known pH, [1] can be controlled by the concentration of oxygen and the temperature of the system. If the redox potential is to be changed, this can be accomplished in a variety of ways which will be understood by one of skill in the art, including addition of convenient pH adjusters such as KOH and $H_2SO_4$. However, it has been determined to be more effective to adjust the redox potential through the use of the ORC's disclsoed herein. In addition, pH adjustment can detrimentally affect the desirable microorganisms, as will be well known by those of skill in the art.

If the redox potential is too high, everything becomes an electron donor and a variety of damaging reactions can occur. It is therefore desirable to keep the redox potential slightly positive so that the metabolism of the microbes is beneficially changed, but the bacteria or other microbes of interest are not harmed.

Slightly higher oxidation potentials than those in [1] and [2] are illustrated below:

$$O_3 + 2 H^+ + 2 e^- = O_2 + H_2O \quad E_0 = 2.07 \quad [4]$$

$$H_2O_2 + 2 H^+ + 2 e^- = 2 H_2O \quad E_0 = 1.77 \quad [5]$$

These are somewhat higher than the range which has been empirically observed. As a reference to show that the desired range is generally in the area of equations [1] and [2], consider that:

$$NO_3^- + 3 H^+ + 2 e^- = HNO_2 + H_2O \quad E_0 = 0.94 \quad [6]$$

Nitrate is used in plant nutrition as a nitrogen source.

Unfortunately, specific optimal redox potential ranges for use in the present invention cannot be accurately set forth due to the chemical complexity of the in situ or other soil system.

The foregoing does indicate, in a general sense, that $MgO_2$ oxygen reacts roughly as per [1] and [2] and, consequently, it is not in the range, as with $H_2O_2$ concentrates and $O_3$, where damage to the microbes and other detrimental chemistry can occur. In an alternate view, leading to the same conclusion, we know that $MgO_2$ has a lower redox value than $H_2O_2$, under the same (standard) conditions, because $MgO_2$ is made from $H_2O_2$. Thus, by the laws of thermodynamics, this could not occur if $MgO_2$ could oxidize water to give $H_2O_2$. Concentrated hydrogen peroxide is a stronger oxidizing agent (higher redox potential) and thus is more difficult to control. The objective of the invention is to beneficially increase the amount of oxygen for the microbes without unwanted side reactions due to oxidative mechanisms.

Introduction of oxygen into the soil by ORCs, whether as a result of the foregoing mechanisms or otherwise, has been determined by the inventors herein to enhance the microbial degradation, transformation or sequestration of soil contaminants. There has therefore been provided in accordance with the present invention a method of enhancing biological treatment of waste materials comprising the application of any feasible peroxides, as agents which release oxygen to the soil.

Feasible peroxides are defined as any peroxide which can be used in a soil system, within defined limits, in a safe and effective manner. Although the redox potential of a given oxygen delivery system may provide a rough indicator of its efficacy, the suitable oxygen delivery systems are best determined empirically, to determine the actual impact on the microbes of interest. Based upon the disclosure herein, feasible peroxides can be identified by one of skill in the art through routine experimentation. These include, but are not limited to hydrogen peroxide, urea hydrogen peroxide, sodium percarbonate, calcium peroxide, potassium peroxide and magnesium peroxide. In addition, zinc peroxide may be used in combination with others. Of the divalent Group II A alkaline metals series, e.g., $Be^{++}$, $Mg^{++}$, $Ca^{++}$, $Sr^{++}$, $Ba^{++}$ and $Ra^{++}$, peroxides of $Mg^{++}$ and $Ca^{++}$ are preferred in the context of the present invention.

More specifically, the present invention incorporates certain properly sized metal peroxides and mixtures of these metal peroxides with phosphates or surfactants, or both, as agents which release oxygen to the soil. By properly sized, it is meant particles having a mesh size of typically less than about 100, but generally no smaller than about 400 mesh under current stabilization technology. Preferably, mesh sizes in the range of from about 200 to about 400 will be used.

Particles of less than about 400 mesh are relatively unstable and for many applications are generally unable to deliver oxygen over a sufficient treatment period to effectively carry out the required reactions. In addition, production of excessively small particle size adds to manufacturing costs. However, the smaller particle sizes result in superior particle mobility. Thus, the smallest particle size obtainable which also exhibits sufficient stability for a given application is most preferred. Stabilizing relatively small particle sizes is preferably accomplished in accordance with the "intercalation" method of the present invention, disclosed infra. Alternatively, particle sizes even larger than 100 mesh may be desired to facilitate handling of the product, especially for dry applications.

Although calcium, potassium and magnesium peroxides have all been found useful, these three compounds are not equivalent. Of these three metal peroxides, magnesium peroxide ($MgO_2$) is preferred. It has been determined to exhibit greater stability, simplifying storage and handling. It increases pH only slightly, avoiding making soils too basic even if a relatively large quantity is employed. It is generally non-toxic in the concentrations contemplated herein (absorption of trace amounts of magnesium is essential in cell biochemistry). It delivers the most oxygen per unit weight. Residual magnesium oxide left after release of the oxygen is benign to humans, animals and the environment, and does not appear to create a problem due to overabundance in potted plants.

Although calcium and potassium peroxide are also useful, they do not appear to be as advantageous as magnesium peroxide. The calcium peroxide has a higher basicity than the magnesium peroxide and may therefore be less desirable for use in alkaline soils. It also leaves a chalk residue and tends to bind up micronutrients. Potassium peroxide is corrosive and difficult to handle because it strongly increases pH, it is a strong irritant and releases oxygen very quickly. The calcium peroxide, magnesium peroxide, potassium peroxide or mixtures thereof are preferably present in an amount ranging from about 5 to about 100 weight percent of the preferred formulation, as will be discussed.

In accordance with the bioremediation method of the present invention, an ORC compound, preferably including magnesium peroxide, calcium peroxide, potassium peroxide or mixtures thereof, is applied to the soil to be treated in an amount effective to increase substantially the activity of aerobic microorganisms in the soil. Dosage requirements will vary considerably, depending upon conditions at the site, such as earth compaction, moisture content, pH, temperature, and application method. Thus, optimal dosages will need to be determined for each site using routine experimentation which will be understood by one of skill in the art.

The current level of skill in the art does not permit precise dosage predictions, in view of the numerous variables involved. Typically, the amount of compound applied to the soil is at least about 100 grams per metric ton of soil and preferably from about one to ten kilograms of compound per metric ton of soil. If the ORC has 10% active oxygen, the above range of dosages should remediate 3.3 to about 333 grams of organic pollutant. If the ORC is twice as active, i.e., 20%, the above range of dosages should remediate 6.6 to about 666 grams of pollutant.

In general, slurries or other fluidized delivery forms can be formulated in a wide variety of concentrations. It is therefore convenient to consider dosages in terms of the amount of active oxygen delivered, regardless of the volume or weight of the suspended ORC.

Thus, for example, if one kilogram of magnesium peroxide is delivered per metric ton of media to be treated, and the magnesium peroxide has a 20% activity, 200 grams of $O_2$ are delivered to the metric ton of media, which can remediate roughly 66 grams of pollution. In a metric ton, 66 grams equates to 66 ppm. For pollutant concentrations as high as hundreds of ppm or greater, concentrations of as high as 1% ORC w/w or greater will be applied. In general, the foregoing dosages are based upon, but not limited by, the general observation that it takes between about 0.01% and 1%, and preferably about 0.1% on a wt/wt basis of 20% active material to effectively treat most pollutants of interest.

In addition, the mode of application of the ORC compounds in accordance with the present invention may vary. For example, the ORC may be applied to relatively compacted earth by spraying in a liquid suspension or slurry form. An initial concentration on the order of that disclosed above can be administered, and bacterial growth counts thereafter taken to assist in optimizing delivery dosages. Alternatively, dry, powder form can be spread or buried. Dry applications will commence oxygen production once wetted. The preferred compound releases to the soil at least about 100 milligrams of atomic oxygen per gram of compound.

One metric ton of soil, for example, has a volume of approximately 1 cubic meter. Therefore, in an application where the ORC is to be dry mixed with the soil to be treated, on the order of one kilogram of ORC would be dry mixed into a cubic meter of soil. Alternatively, a slurry can be prepared to infiltrate the same cubic meter, if it is sufficiently penetrable, at a delivery volume which will deliver essentially the same dosage. Thus, one kilogram of ORC might be suspended, for example, in approximately 40 liters of water for application to a cubic meter of soil. More or less fluid can be utilized to accomplish any of a variety of objectives. For example, different delivery apparatus may require a more or less viscous suspension. In addition, an outer limit exists on the amount of moisture a given soil can maintain. Thus, for damp soils which are approaching aqueous saturation, a dry form of the ORC or a relatively high concentration aqueous slurry may be preferred.

The rate at which the metal peroxides will release oxygen to the soil may be slowed by including an oxygen release rate modifier such as a source of phosphate ion ($PO_4^{-3}$) in the formulation. This is particularly advantageous in applications in which it is desirable to provide the benefits of oxygenation over a time interval which is greater than found with unintercalated metal peroxides. When phosphate is added to the wet slurry in accordance with the "intercalation" method disclosed herein, it takes a substantially longer period of time for the metal peroxide to decompose to release the oxygen. Preferably, simple phosphate ion (not polyphosphate) will be used. Polyphosphates are less effective per unit weight, less available as a nutrient, and more prone to cause various colloidal effects.

To demonstrate the effect of phosphate intercalation, 11 separate pairs of batches of magnesium peroxide were manufactured by reacting magnesium oxide with hydrogen peroxide. The same methodology was used to make each pair of batches, except that one part had no phosphate ion added while the other part had 3% phosphate ion added during the manufacturing process. The later product is called "phosphate-intercalated, time-release magnesium peroxide." After the reactions were completed, the products were dried.

The active oxygen content of the phosphate-intercalated, time-release magnesium peroxide was higher in all 11 of the pairs of batches than the regular magnesium peroxide. The average percentage increase for the active oxygen content with phosphate intercalation was 22.6%.

These experiments demonstrate that not only do phosphate intercalates of metal peroxide create a controllable time release product as discussed elsewhere in the patent application, but it also increases the yield of the manufacturing process, improves the quality of the product, and lowers the cost of production of the product with a given level of active oxygen. This last point is particularly important, since the major cost component in the metal peroxide manufacturing process is the oxygen source, which is generally concentrated hydrogen peroxide. The phosphate intercalated material is also more stable in terms of shelf life, safety, and handling during field applications.

The amount of phosphate used varies, depending on the desired characteristics sought to be achieved, but generally from about 0.03 to about 1.60 grams of phosphate compound is used per gram of metal peroxide. The molecular structure of the phosphate, and the desired rate of release, control the amount used. Where the release is to be slightly faster, or the phosphate used is desired to be a more acidic buffer (e.g., $KH_2PO_4$), the lower weights are used. Where the release is to take place over long times or the soil is acidic and a more basic buffer is desired (e.g., $K_2HPO_4$), the higher weights are used. Thus a slower release requiring an acidic buffer would use a moderate amount of $K_2HPO_4$. These compounds are used in this example since it is easier to see that the percent of $PO_4^{-3}$ is greater in $K_2HPO_4$ than in $KH_2PO_4$.

As a rough approximation, 200 mesh $MgO_2$ in aqueous solution at pH of about 7 (prior to addition of $MgO_2$) at STP will liberate substantially all of the available oxygen within about 100 hours. The intercalation of 0.03 grams of potassium dihydrogen phosphate per gram of 325 mesh $MgO_2$ under the same conditions will extend the oxygen delivery period out to about 14 days. The intercalation of 1.6 grams of potassium dihydrogen phosphate per gram of $MgO_2$ under the same conditions will likely extend the delivery period out to 30 days or even significantly longer depending upon mesh size.

For calcium peroxide, from about 0.03 to about 1.23 grams of phosphate per gram of calcium peroxide is used. For potassium peroxide, from about 0.03 to about 0.80 of phosphate per gram of potassium peroxide is used. For magnesium peroxide, from about 0.03 to about 1.60 grams of phosphate compound per gram of magnesium peroxide is used. The preferred sources of the phosphate ion are potassium dihydrogen phosphate, dipotassium hydrogen phosphate, urea phosphate, monoammonium phosphate and diammonium phosphate.

In accordance with another aspect of the method of the present invention, the ORC preferably includes a surfactant for suspending the particles prior to delivery in fluid form, enhancing dispersibility of the ORC in the media and enhancing liberated oxygen transport through the treated media. Preferably, the surfactant is non-toxic to plants and animals and will not appreciably enlarge the pollutant plume.

In weight percent terms, the surfactant will generally be present within the range of from about 0.05% to about 2.0% of the weight of the peroxide composition. Preferably, the surfactant will be present in the range of from about 0.1% to about 1%, and most preferably about 0.1 weight % of surfactant will be used. However, for specific applications, significantly more surfactant may be desirable.

Surfactants which are generally non-toxic to plants are disclosed, for example, in U.S. Pat. No. 4,171,968, the disclosure of which is hereby incorporated by reference. In general, suitable surfactants include alcohol ethoxylate sulfates, acyl taurides and ethoxylated alcohols. Specifically, the following classes of surfactants are contemplated by the inventors herein:

(1) long chain alcohol ethoxylate sulfates of the formula RO—(CH$_2$CH$_2$O)—$_n$ SO$_3$Na where R is about C$_{12}$ to C$_{18}$, and n is no greater than about 9 to 10;

(2) long chain acyl taurides of the formula RCON(CH$_3$)C$_2$H$_4$SO$_3$Na where R is about C$_{14}$ to C$_{20}$; and (3) long chain ethoxylated alcohols of the formula RO—(CH$_2$CH$_2$O)—$_n$ H where R is about C$_{14}$ to C$_{20}$, and n is no greater than about 9 to 10.

One type of class (2) surfactants (istheionates) may be obtained from Rhone Poulenc under the trade name Igepon. In another embodiment, the surfactant is a monolaurate, monopalmitate, monostearate or monooleate ester of sorbitol, or mixtures thereof, either with or without ethoxylation. These compounds are sold by ICI America under the brand names of Tween and Span.

In accordance with a further aspect of the method of the present invention, the ORC bioremediation compound may include an effective amount of metal selected from the group consisting of zinc, copper, molybdenum, boron, selenium, cobalt, aluminum, manganese, iron, and nickel. Such metals are bioactive agents which either suppress or enhance the growth of selected microorganisms.

Trace metals act as cofactors for enzymes which the microbes need to perform various life supporting functions. Certain trace metals, notably zinc, inhibit their anaerobic enzymatic activity without killing the organisms or impairing aerobic function. Iron, manganese and copper enhance aerobic activity. Molybdenum, and to a lesser extent cobalt, appear to enhance both types of metabolic activities. While this pattern was true for organisms which inhabit the human body, different but unique patterns should be true for all organisms.

An effective amount of metal is preferably sufficiently low that upon application of the composition to the soil toxic effects with respect to microbes, plants and animals is avoided, and is sufficiently high to enhance the microorganisms sought to be assisted. The trace elements will generally be in the range of 0.005% to 0.1% for copper; 0.001% to 0.05% for cobalt and nickel; 0.001% to 0.2% for molybdenum and aluminum; 0.01% to 0.4% for zinc; and 0.01% to 0.8% for manganese and iron. In general, an effective amount of metal is less than about 1000 parts per million of the preferred peroxide-surfactant-phosphate composition.

Although not necessary for many bioremediation applications, it may also be desirable to include a fertilizer nutrient or other beneficial additives blend in the ORC composition. A typical fertilizer composition comprises: (a) nitrogen, expressed as atomic nitrogen, in an amount ranging from about 1 to about 35 weight percent, (b) phosphorous, expressed as phosphorus pentoxide, in an amount ranging from about 1 to about 35 weight percent, (c) potassium, expressed as potassium oxide, in an amount ranging from about 1 to about 35 percent, and (d) calcium peroxide, magnesium peroxide, potassium peroxide, or mixtures thereof, in an amount ranging from about 5 to about 60 or even 90 or higher weight percent. Preferably, the N-K-P value of this fertilizer composition is in excess of about 15:15:15. The ratio of nitrogen, phosphorous and potassium may be varied throughout a relatively wide range depending upon the application, as will be appreciated by one of skill in the art.

Combinations of metal peroxides with phosphate, together with trace elements and surfactant, may be sufficient for some applications. However, in a bioremediation application in which additional nutrient supplementation is desired, a wide variety of different formulations of fertilizers may be made utilizing the principles of this invention. The nominal percentages of the various macronutrients, micronutrients, and surfactant could be varied to provide fertilizers having formulations tailored to the specific environments in which they are used. The ingredients of several formulations and typical weight ranges are as follows:

| Ingredient | Weight Percent |
| --- | --- |
| magnesium peroxide | 5–60 |
| potassium dihydrogen phosphate | 0–40 |
| dipotassium hydrogen phosphate | 0–40 |
| diammonium phosphate | 0–45 |
| potassium nitrate | 0–40 |
| ammonium nitrate | 0–50 |
| urea | 0–60 |
| trace metals | 0.0–5.0 |
| surfactants | 0.0–0.2 |

Preferred fertilizer-enhanced bioremediation ORC formulations of this invention include the following compositions:

Fertilizer Enhanced QRC I from 10 to 25 weight percent magnesium peroxide,
from 10 to 25 weight percent potassium dihydrogen phosphate,
from 15 to 25 weight percent dipotassium hydrogen phosphate,
from 40 to 60 weight percent urea,
from 0 to 2.0 weight percent trace metals, and
from 0 to 0.2 weight percent surfactant.

Fertilizer Enhanced ORC II from 10 to 25 weight percent magnesium peroxide,
from 30 to 50 weight percent diammonium phosphate,
from 15 to 30 weight percent potassium nitrate,
from 15 to 25 weight percent urea,
from 0 to 2.0 weight percent trace metals, and
from 0 to 0.2 weight percent surfactant.

Fertilizer Enhanced ORC III from 10 to 25 weight percent magnesium peroxide, from 30 to 45 weight percent diammonium phosphate,
from 5 to 30 weight percent potassium nitrate,
from 15 to 50 weight percent ammonium nitrate,
from 0 to 2.0 weight percent trace metals, and
from 0 to 0.2 weight percent surfactant.

Typical specific formulations are as follows:

Formulation A

| | |
|---|---|
| 19.96% | magnesium peroxide |
| 15.30% | potassium dihydrogen phosphate |
| 17.96% | dipotassium hydrogen phosphate |
| 46.57% | urea |
| 0.1% | trace metals |
| 0.1% | surfactant |

The above Formulation A is based upon employing chemical quality ingredients and the nominal percentages may vary slightly as a consequence. The magnesium peroxide could be as low as 5 percent in the above formulation and still provide oxygen release. In applications where a relatively high oxygen release is required, the above formulation may contain as much as 50 percent or more magnesium peroxide.

The above Formulation A gives an N-P-K value of 21.74-15.30-15.01, with the P expressed as $P_2O_5$ and K expressed as $K_2O$. The potassium dihydrogen phosphate appears to be slightly preferred when it is desired that the product release oxygen over a one to two week period. Thus, it may be desirable to employ only this phosphate and not a mixture of the potassium dihydrogen phosphate and the dipotassium hydrogen phosphate. Either or both of these phosphates are preferably added to the slurry during the preparation of the magnesium peroxide as is the surfactant.

If the magnesium peroxide is made by reacting magnesium oxide with aqueous hydrogen peroxide as illustrated in Example 1, Formulation A has been shown to release 48 milligrams of oxygen per gram of fertilizer material blended with a gallon of water. However, even if the magnesium peroxide was in an impure state, for example, only 15 percent of the weight of oxygen in the reaction mix, such a material when used in Formulation A would still provide oxygen release of 30 milligrams of oxygen per gram of fertilizer. Thus, if there is an incomplete reaction during the manufacture of the magnesium peroxide, or over-drying, the fertilizer product will still have the desired oxygen release property.

Formulation B

It has been found that the magnesium peroxide concentration could be as low as about 11 percent if the magnesium peroxide contains 25 weight percent active oxygen and the oxygen release would still be maintained at about 26 milligrams atomic oxygen per gram of fertilizer. The following Formulation B illustrates such a product.

| | |
|---|---|
| 11.74% | $MgO_2$ |
| 18.34% | $KH_2PO_4$ |
| 18.34% | $K_2HPO_4$ |
| 51.36% | urea |
| 0.11% | trace metals |
| 0.11% | surfactant |

Formulation B has a N-P-K value of 23.98:17.04:16.27.

Formulation C

Formulation C provides magnesium peroxide at an active oxygen concentration of 15 percent, thus providing 30 mg $O_2$/g of fertilizer.

| | |
|---|---|
| 19.96% | magnesium peroxide |
| 38.26% | diammonium phosphate |
| 21.62% | potassium nitrate |
| 19.96% | urea |
| 0.1% | trace metals |
| 0.1% | surfactant |

Formulation C is a less expensive fertilizer. Again the diammonium phosphate is added to the magnesium peroxide prior to drying. Diammonium phosphate is slightly hygroscopic and needs to be protected from moisture pick up. Mixing the magnesium peroxide and the diammonium phosphate before drying does prevent water pick up. Formulation C nominally has an N-P-K value of 20.43:20.56:20.15.

Formulation D

Formulation D is based upon the magnesium oxide being present with at least 25 percent active oxygen purity. The amount of peroxide may be reduced to provide 26 mg $O_2$/g of fertilizer. Formulation D is:

| | |
|---|---|
| 11.74% | magnesium peroxide |
| 42.19% | diammonium phosphate |
| 23.84% | potassium nitrate |
| 22.01% | urea |
| 0.1% | trace metals |
| 0.1% | surfactant |

The N-P-K value for this Formulation D is 22.53:22.67:22.22.

Formulation E

In Formulation E, the active oxygen is as low as 15%, and the oxygen release is about 30 mg $O_2$/g of fertilizer:

| | |
|---|---|
| 19.96% | magnesium peroxide |
| 38.26% | diammonium phosphate |
| 21.62% | potassium nitrate |
| 19.96% | ammonium nitrate |
| 0.1% | trace metals |
| 0.1% | surfactant |

The N-P-K value for this Formulation E is 18.11:20.56:20.15.

Formulation F

In Formulation F, the active oxygen is greater than 25%, and the oxygen release is about 20 mg/g of fertilizer:

| | |
|---|---|
| 11.74% | magnesium peroxide |
| 42.19% | diammonium phosphate |
| 23.84% | potassium nitrate |
| 22.01% | ammonium nitrate |
| 0.11% | trace metals |
| 0.11% | surfactant |

The N-P-K value for this Formulation F is 19.97:22.67:22.22.

Formulation G

In Formulation G, the active oxygen is at least 15%, and the oxygen release is about 27 mg/g of fertilizer:

| | |
|---|---|
| 17.96% | magnesium peroxide |
| 33.27% | potassium dihydrogen phosphate |
| 6.65% | potassium nitrate |
| 41.92% | ammonium nitrate |
| 0.1% | trace metals |
| 0.1% | surfactant |

The N-P-K value for this Formulation G is 15.61:17.35:17.71.

Formulation H

In Formulation H, the active oxygen is at least 25%, and the oxygen release is about 29 mg/g of fertilizer:

| | |
|---|---|
| 11.49% | magnesium peroxide |
| 35.89% | potassium dihydrogen phosphate |
| 7.18% | potassium nitrate |
| 45.23% | ammonium nitrate |
| 0.11% | trace metals |
| 0.11% | surfactant |

The N-P-K value for this Formulation H is 16.84:18.72:19.11.

In accordance with the method of making the fertilizer enhanced ORC in accordance with the present invention, the metal peroxide is first prepared in an aqueous solution. In general, the metal oxide, metal hydroxide or metal carbonate is reacted with hydrogen peroxide to produce the metal peroxide. The reactions are generally non-stoichiometric. For example, magnesium peroxide could be prepared by one of the following three reactions:

$$MgO + H_2O_2 = MgO_2 + H_2O \qquad [7]$$

$$Mg(OH)_2 + H_2O_2 = MgO_2 + 2 H_2O \qquad [8]$$

$$MgCO_3 + H_2O_2 = MgO_2 + H_2O + CO_2 \qquad [9]$$

where
  $MgO_2$ is magnesium peroxide
  $H_2O_2$ is hydrogen peroxide
  MgO is magnesium oxide, also called magnesia
  $H_2O$ is water
  $Mg(OH)_2$ is magnesium hydroxide
  $MgCO_3$ is magnesium carbonate
  $CO_2$ is carbon dioxide gas The magnesium oxide and hydrogen peroxide reaction is the preferred way to produce the magnesium peroxide utilized in this invention from the viewpoint of providing highest oxygen activity. The magnesium carbonate could be used as the starting material and it does not require cooling, but it is more costly. Any suitable source of magnesium oxide, commercial grade, is acceptable, preferably 100 to 400 mesh particles are used if the magnesium peroxide is to be dispersed in water. Particle size is not as important if the $MgO_2$ is to be applied in dry form. Due to surface area reactivity characteristics, finer particle sizes result in higher activity in the final product.

The hydrogen peroxide is sold as a water solution containing from about 3 to 70 percent by weight of hydrogen peroxide. Typically, the commercial grade solution of hydrogen peroxide contains 30 to 35 percent of the hydrogen peroxide and this is the material typically utilized in the method of this invention.

The reaction of magnesium oxide and hydrogen peroxide is exothermic, and the temperature must be controlled so that excess heating does not occur. Moreover, water is removed after the reaction is completed to produce a dry product. The drying must be done in a manner which does not destroy the metal peroxide which, for example in the case of magnesium peroxide, decomposes at 160° or 320° F.

In general, the heating process is preferably controlled so that the temperature does not exceed about 110° C. Temperatures as low as about 40° C. with vacuum may also be used. The magnesium peroxide does not decompose in any significant quantities under such temperature conditions. It is important that the magnesium peroxide formed be maintained as a peroxide, so that the desired oxygen release characteristic is attained when applied to soil. The best way to make magnesium peroxide with the highest oxygen activity presently known to the inventors is to vacuum dry at the lowest possible temperature.

It is desirable during the production of the metal peroxide that the maximum amount of metal peroxide be produced. For example, magnesium peroxide, if perfectly pure, would contain 28.4 percent by weight oxygen for release. For calcium peroxide, the percent by weight oxygen is 22.2 percent. And for potassium peroxide, the percent by weight oxygen is 14.5 percent. Consequently, on a weight-for-weight basis, none of the other metal peroxides match magnesium peroxide. Moreover, at equal levels of active oxygen, the magnesium peroxide will always have the lowest weight in the formulation.

Used with the same concentrations, products using the potassium and calcium peroxide will not deliver as much active oxygen as products using the magnesium peroxide, since they cannot carry as much oxygen per unit weight. The metal peroxide does not, however, have to be perfectly pure. In accordance with this invention, the magnesium oxide is mixed with an aqueous solution of hydrogen peroxide to produce a metal peroxide having an acceptable purity so that it typically contains at least about 5 percent and preferably at least about 15 percent by weight oxygen to be released to the soil.

Since the reaction between the magnesium oxide and hydrogen peroxide is exothermic, the temperature of the reaction must be controlled. This is preferably accomplished by blending the hydrogen peroxide with the magnesium oxide in two steps. The aqueous hydrogen peroxide solution for a given batch is divided approximately into equal portions. The magnesium oxide is slowly added to one of these portions, allowing the heat to dissipate slowly to avoid explosive or extremely ebullient reaction conditions occurring in the reaction vessel, which is preferably a water-cooled, jacketed container.

Magnesium oxide powder is added to the first portion preferably in portions or metered at a rate to maintain the temperature of the reacting mixture at about 40° C., with vacuum. After all the magnesium oxide is added, the temperature of the reaction mixture is lowered to about 35° C. and then the balance of the aqueous hydrogen peroxide solution is slowly added with stirring and cooling to avoid an excessively high reaction temperature. This aqueous slurry of magnesium peroxide, which consists of fine particles dispersed throughout the water, is then dried to produce a granular material. This can be accomplished by heating under vacuum, oven drying or spray drying.

It is desirable to control or regulate the rate at which oxygen is released so that the release occurs over a prolonged period of time. To accomplish this, a phosphate-containing material such as has been previously described is added to the aqueous medium before completion of drying. Most preferably, the $PO_4^{-3}$ donor is added to the slurry while $H_2O_2$ is still present. This has been determined to produce a desirable "intercalation" of the phosphate into the peroxide, as opposed to merely an exterior coating. The phosphate-containing material, in addition to regulating the rate at which oxygen is released, also provides the macronutrient phosphorous.

The dried product containing the magnesium peroxide is then dry-blended with any other desired ingredients, for example urea, which provides the nitrogen and ingredients containing potassium and other supplements such as trace minerals. When it is desirable to include the surfactant, the surfactant is added to the aqueous medium prior to drying, if the surfactant is stable in water. If the surfactant is unstable in water, such as the istheionates, it may be dry blended after drying.

EXAMPLES

The following presents several formulations of the ORC compositions of this invention and the method of making and using these compositions.

EXAMPLE 1

Preparation of Magnesium Peroxide

To produce 56.3 grams of magnesium peroxide, 40.3 grams of magnesium oxide and 94 cubic centimeters of a 34 weight percent aqueous hydrogen peroxide solution are used. To ensure completeness of the reaction between the magnesium oxide and hydrogen peroxide, excess hydrogen peroxide, for example, approximately 150 cubic centimeters of the aqueous hydrogen peroxide is acceptable.

This is divided into approximately two equal portions. The first portion, or 75 cubic centimeters, is placed in a water-jacketed reaction vessel and the powdered magnesium oxide is added slowly, keeping the temperature of the reaction ingredients at approximately 40° C. After all the magnesium oxide powder has been added to the reaction mixture, the temperature is lowered to 35° C. and the second half of the hydrogen peroxide solution is added to the reaction vessel, with stirring and cooling to prevent the liquid reaction slurry from bubbling out of the reaction vessel.

The liquid slurry produced is then dried by heating at a temperature of 90°-110° C. in an oven provided with vacuum to produce a fine granular powdery magnesium peroxide having a mesh size of approximately 325. It is preferably that the magnesium peroxide be in a highly powdered form so that if it is subsequently mixed with water it can be easily dispersed in the water, since neither magnesium peroxide nor the resulting magnesium oxide produced after release of oxygen is soluble in water.

EXAMPLE 2

Time Release ORC

This example is similar to Example 1 in that essentially the same amounts of reagents are used. In this example 43.2 grams of potassium dihydrogen phosphate is dry blended with the magnesium oxide prior to mixing with the hydrogen peroxide solution. The drying is conducted at 40° C. under vacuum. A product with a higher oxygen activity is produced using the procedure of this example than produced in Example 1.

EXAMPLE 3

Time Release ORC

This example is essentially the same as Example 1, except 43.2 grams of potassium dihydrogen phosphate is added to the liquid slurry prior to drying.

EXAMPLE 4

Nutrient Supplemented ORC

This example is similar to that of Example 1 except an entire fertilizer formulation is formed in the aqueous blend. In this example, 40.3 grams of magnesium oxide are added with 43.2 grams of potassium dihydrogen peroxide, 50.7 grams of dipotassium hydrogen peroxide, 131.5 grams of urea, 0.3 grams of trace metals and 0.3 grams of surfactant. In this example, 200 cubic centimeters of hydrogen peroxide solution is used to keep the slurry fluid. The blend is dried at 80°-100° C. under vacuum.

EXAMPLE 5

Time Release ORC With Surfactant

This example is essentially the same as Example 2, except 0.3 gram of the surfactant monolaurate sorbitol ester is added to the aqueous slurry of the magnesium peroxide and the potassium dihydrogen phosphate before drying.

EXAMPLE 6

ORC With Surfactant

This example is essentially the same as Example 1, except 0.3 gram of the surfactant monolaurate sorbitol ester is added to the aqueous slurry of magnesium peroxide. Upon drying, a powder is provided having a mesh size of 200. This powder may be dispersed readily in water and applied either directly to the soil or to seeds prior to planting.

EXAMPLE 7

Preparation of Nutrient Supplemented Calcium Peroxide ORC

To prepare 50 grams of calcium peroxide, 38.9 grams of calcium oxide and 38.3 grams of potassium dihydrogen phosphate is added to 54 milliliters of 34% hydrogen peroxide solution slowly to allow thorough reaction. After the mixing is complete another aliquot of 54 milliliters of the hydrogen peroxide solution is added slowly allowing the reaction to go to completion. To the aqueous slurry is added 0.3 gram of surfactant and the slurry is dried at 40° C. in a vacuum. The dried material containing the phosphate stabilized calcium peroxide is then dried blended with 116.6 grams of urea, 45 grams of dipotassium hydrogen phosphate to provide a fertilizer with an N-P-K of 20:15:15.

EXAMPLE 8

Preparation of Nutrient Supplemented Potassium Peroxide ORC

To prepare 50 grams of potassium peroxide, 62.7 grams of potassium carbonate mixed with 38.3 grams of potassium dihydrogen phosphate and 0.3 gram of surfactant is added slowly to 70 milliliters of 34% hydrogen peroxide solution. The reaction is carried out inside a vacuum oven so that immediately after the reaction is completed the mixture is dried at 40° C. or less under high vacuum. The dry reaction product is dry blended with 116.6 grams of urea and 45 grams of dipotassium hydrogen phosphate to provide a fertilizer of N-P-K of 20:15:32.

EXAMPLE 9

ORC Stimulation of Bacterial Growth

An initial experiment was conducted to determine the effect on bacterial growth of an ORC in accordance with the present invention. The procedure and rationale were as follows:

The experiment commenced by the depression of growth of aerobic microbes by purging the soil with nitrogen. This procedure creates an anaerobic or microaerophilic environment by displacement of oxygen. The hypothesis is that the aerobic population which has been repressed in the foregoing manner will recover as a function of the oxygen provided by ORC. A period of 12 to 24 hours of anaerobiosis was considered effective for a significant partial repression of the indigenous aerobic populations.

Natural populations were chosen, as opposed to inocula, because cultures that are introduced may fail to become established. The soil was dry mixed with different levels of water-activated of ORC, described below, prior to nitrogen purging. Activation of the ORC is then accomplished through introduction of deoxygenated water at an appropriate point after anaerobiosis is achieved.

The degree of recovery of the population, as a function of the activity of the ORC, is illustrated in the following hypothetical case, in which $T_0$ is defined as the time anaerobic conditions are established, $T_1$ is the time anaerobic conditions are terminated by exposure to air, and $T_2$ is the point at which growth is measured after exposure to air.

If a population of aerobic microbes is repressed to a level of 1% of normal during the anaerobic incubation ($T_0-T_1$), and recovers to 10% of normal at $T_2$, and if with ORC in the system during the anaerobic incubation ($T_0-T_1$), the recovery is to 50% of normal at $T_2$, the conclusion would be that ORC is supporting the growth of aerobes in the "anaerobic" environment. ORC might maintain the microbial population, at 5% of normal during anaerobic incubation, which would explain a recovery level to 50% of normal at $T_2$. Plate counts at $T_2$ can accurately determine aerobic populations, since exposure to air for several days eliminates the anaerobes. Also, the population of anaerobes is probably not significant at the start, since the soil samples in advance of $T_0$ have been aerated.

Thus, various amounts of 26% active oxygen $MgO_2$ ORC, (0 (control), 1 mg, 10 mg, and 100 mg), were mixed directly into 10 g aliquots of soil known to contain hydrocarbon utilizing bacteria. The ORC was activated with the addition of deoxygenated water and then incubated in an anaerobic chamber for two days, after which they were plated to standard plate count media (as described above), and placed in anaerobic incubator for two days. The test produced the following results:

Control:100 ($\times 10^5$)
1 mg ORC:130 ($\times 10^5$)
10 mg ORC:190 ($\times 10^5$)
100 mg ORC:750 ($\times 10^5$)

It appears from this test that ORC did stimulate growth of bacteria. See FIG. 1.

EXAMPLE 10

ORC Stimulation of Bacterial Growth

This example is provided to show that under anaerobic conditions, magnesium peroxide in the contemplated formulation described herein, provides sufficient oxygen for aerobic microbial growth as documented by the increased number of bacterial colonies, in a given volume of soil following ORC treatment.

Approximately 500 grams of a soil containing hydrocarbon pollutants and native bacteria was homogenized by mixing and split into samples for biological testing.

Biological Analysis

ORC with an activity of 20% (200 mg $O_2$/g ORC) was added to 10 g subsamples of this soil in the following amounts: 0 (control), 1, 10 and 100 mg. Three replicates of each concentration were established.

| CONCENTRATION | Results Summary: | | | |
|---|---|---|---|---|
| | REPLICATE A | REPLICATE B | REPLICATE C | MEAN |
| CONTROL | 2,000,000 | 2,300,000 | 2,100,000 | 2,100,000 |
| 0.01% ORC "A" | 1,800,000 | 2,200,000 | 1,900,000 | 2,000,000 |
| 0.1% ORC "A" | 3,900,000 | NC* | NC* | 3,900,000 |
| 1.0% ORC "A" | 4,200,000 | 4,300,000 | 5,600,000 | 4,700,000** |

*Bacteria colony counts not determined due to excessive growth on plates,
**significiantly different from control (ANOVA alpha = 0.05).
NOTE:
0.1% concentration not included in statistical analysis due to lack of replication. Reading are in CFU/ml (Colony Forming Units per ml).

Figure 2:
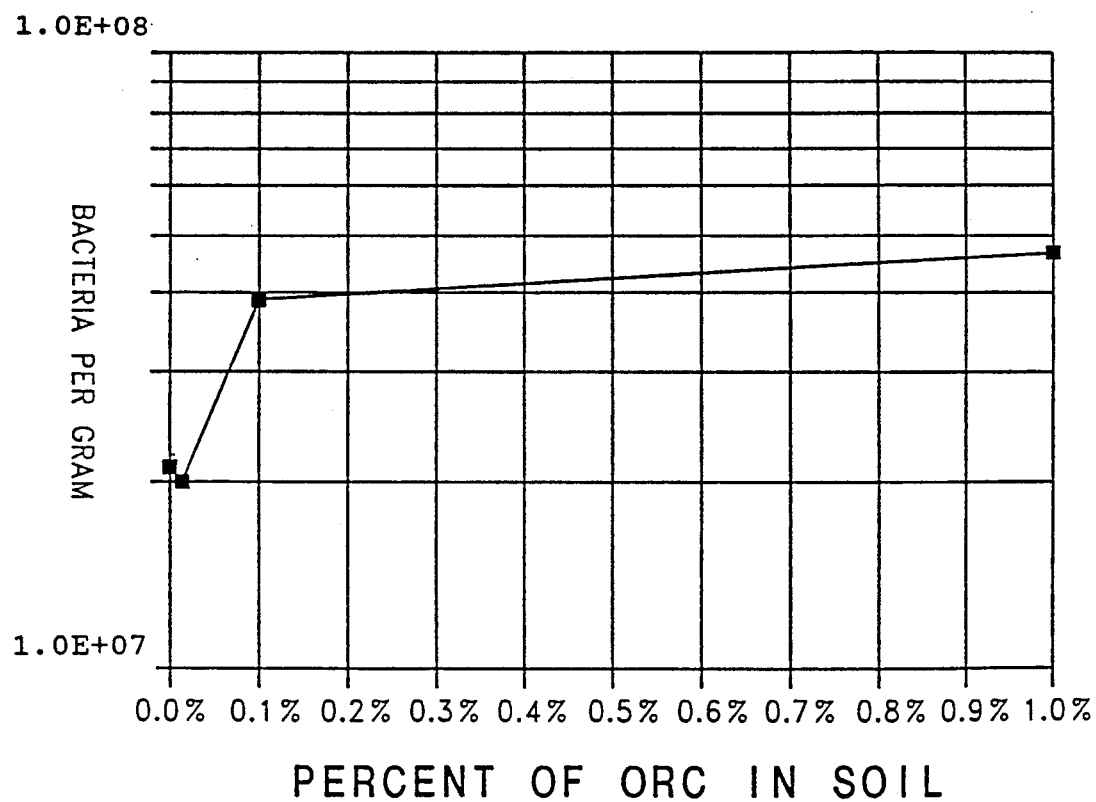
FIG. 2 is a semi-log plot illustrating the effect of varying dosages of ORC on bacterial count in a soil sample, in accordance with Example 10.

These results indicate that both the addition of 1.0% ORC results in a significant increase in microbial population growth over the control. See FIG. 2. Also, the value for 0.1% may be significant and, if it is, then a value between 0.01% and 0.1% would define the real minimum effective dose under these conditions.

Thus, under anaerobic or microaerophilic conditions, magnesium peroxide in the contemplated formulation described herein provides sufficient oxygen for microbial growth as observed by increased concentrations of bacterial colonies in a given volume of soil.

EXAMPLE 11

Degradation of Diesel Fuel

This set of experiments assesses the ability of ORC, with or without $PO_4^{-3}$ but having the same composition as that in Example 9 (with a 20% oxygen activity) to treat anaerobic soil, but facilitating the degradation of diesel fuel and hydrocarbons of varying lengths.

An additional 100 mg/10 g soil of a second ORC compound having a composition of 97% $MgO_2$ (activity 20%) and 3% $PO_4$ was also established in triplicate. The compound without $PO_4$ is hereinafter designated as ORC A (0-0) and with $PO_4$ is designated as ORC B (3-0). ORC compounds A and B were then activated by the addition of deoxygenated water and incubated at 35° C. for two days under anaerobic conditions. Slurries from each of these replicates were then plated for bacterial determination ($10^{-4}$, $10^{-5}$ and $10^{-6}$ dilutions in duplicate) following the pour plate method (Method No. 9251B, Standard Methods 17th Ed.) and for an additional 48 hr. at 35° C. under aerobic conditions.

10.0±0.2 grams of soil from a selected bioremediation project known to contain highly weathered diesel fuel No. 2 was placed into 20 ml. septum sealable vials. The vials were marked in sets of three as follows:

| Concentration | SET 1 | SET 2 | SET 3 |
| --- | --- | --- | --- |
| Control | C1 | C2 | C3 |
| 1MG-A | 1A1 | 1A2 | 1A3 |
| 10MG-A | 10A1 | 10A2 | 10A3 |
| 100MG-A | 100A1 | 100A2 | 100A3 |
| 100MG-B | 100B1 | 100B2 | 100B3 |

0 mg ORC (control), 1 mg, 10 mg and 100 mg of ORC "A" were added to the soil samples in triplicate. One level of ORC B was also used (100 mg/10 g of soil). It is expected that similar results would be obtained using other bioremediation formulations containing magnesium peroxide such as those prepared in accordance with the formulations disclosed herein.

With the septum seal caps on the vials loosely in place, each vial was purged with nitrogen gas slowly for at least 20 minutes to remove oxygen from the vials. The procedure was performed by introducing a stainless steel needle through the septum. The needle was extended to the bottom of the vial so that oxygen was displaced from the bottom to the top and out through the threads of the cap. The vials were agitated approximately every five minutes so that oxygen did not remain trapped in any of the voids. Once purging was completed, the caps were screwed on tightly.

Deoxygenated water was prepared by boiling 200 ml. distilled deionized (ultra-pure) water for 10 minutes. The water was removed from the heat and blanketed with a layer of nitrogen gas to maintain the deoxygenated state. The water was covered with a watch glass and cooled to ambient temperature. After cooling, 1 ml. of the deoxygenated water was injected into each vial through the septum to activate the ORC complex. Vials were agitated to distribute the ORC and moisture in the soil. All vials were stored at ambient temperature in the dark for 30 days.

Following the 30-day incubation, the vials were extracted with Freon-113 and analyzed for total petroleum hydrocarbons by Flame-Ionization Gas Chromatography. The instrument was calibrated with Diesel Fuel #2 and the method protocol was taken from the appendix of the State of California, Field Manual for Leaking Underground Fuel Tanks.

The results below represent the average values of Diesel Fuel #2 in soil expressed in mg/kg:

| Sample (in 10 g) | Median Value |
| --- | --- |
| Control | 63.3 ± 5.2 |
| 1 mg ORC A | 68.3 ± 111.2 |
| 10 mg ORC A | 48.0 ± 19.7 |
| 100 mg ORC A | 34.2 ± 8.9 |
| 100 mg ORC B | 34.3 ± 20.2 |

The overall results indicate that there is a significant reduction (using the t-statistic at a 95% confidence interval) in the concentration of Diesel Fuel #2 over controls in the 10 mg ORC/10 g soil and the 100 mg ORC/10 g soil samples. The time release formula ORC B, with phosphate, is also seen to be effective. All the values are at least triplicate samples and the deviations show the difficulties in obtaining homogeneous samples of polluted systems. It should be noted that in these living systems, faced with inhomogeneous types of real pollutants, it is beyond the state of the art to determine exactly how much oxygen is required over what periods of time in order to optimize the removal of the pollutant. However, the oxygen supplied to the microorganisms would ideally be supplied at the exact rate they needed it to consume the pollutant. In this example, of 30 days duration, the total amount of oxygen released was the same for ORC A and B since the ORC B release profile extended the release time to only 14 days. The results show that the longer release profile did not interfere with the organism's use of the diesel fuel and even longer release profiles would be used to advantage. It appears to be a part of the developing bioremediation art that the longer, slower releases will be the most desirable due to the difficulty the organisms have with the pollutants.

Figure 3:
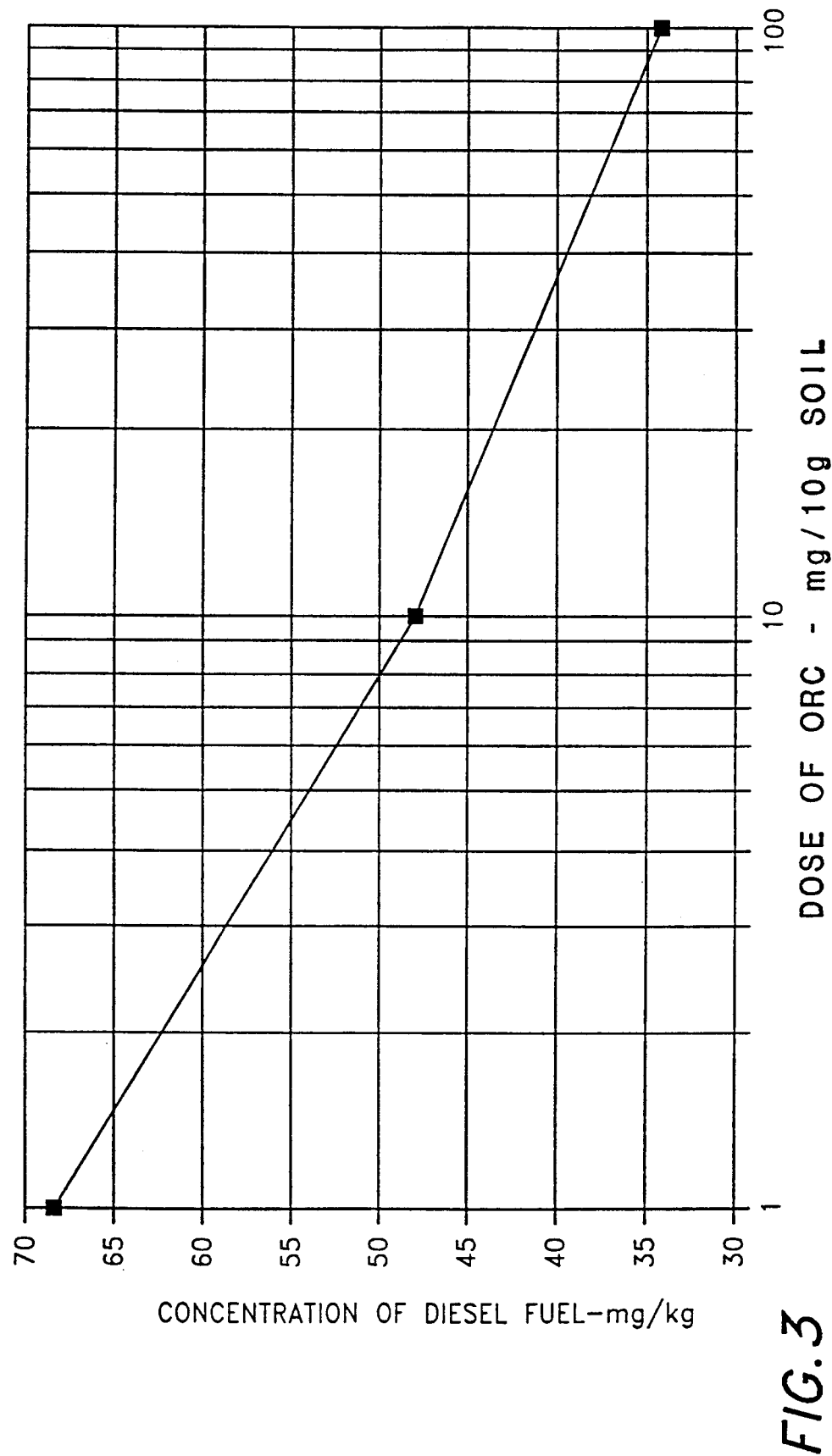
FIG. 3 is a semi-log plot showing dose response of ORC in bioremediation of diesel fuel.

FIG. 3 is a dose response semi-log plot for ORC A only.

Figure 4:
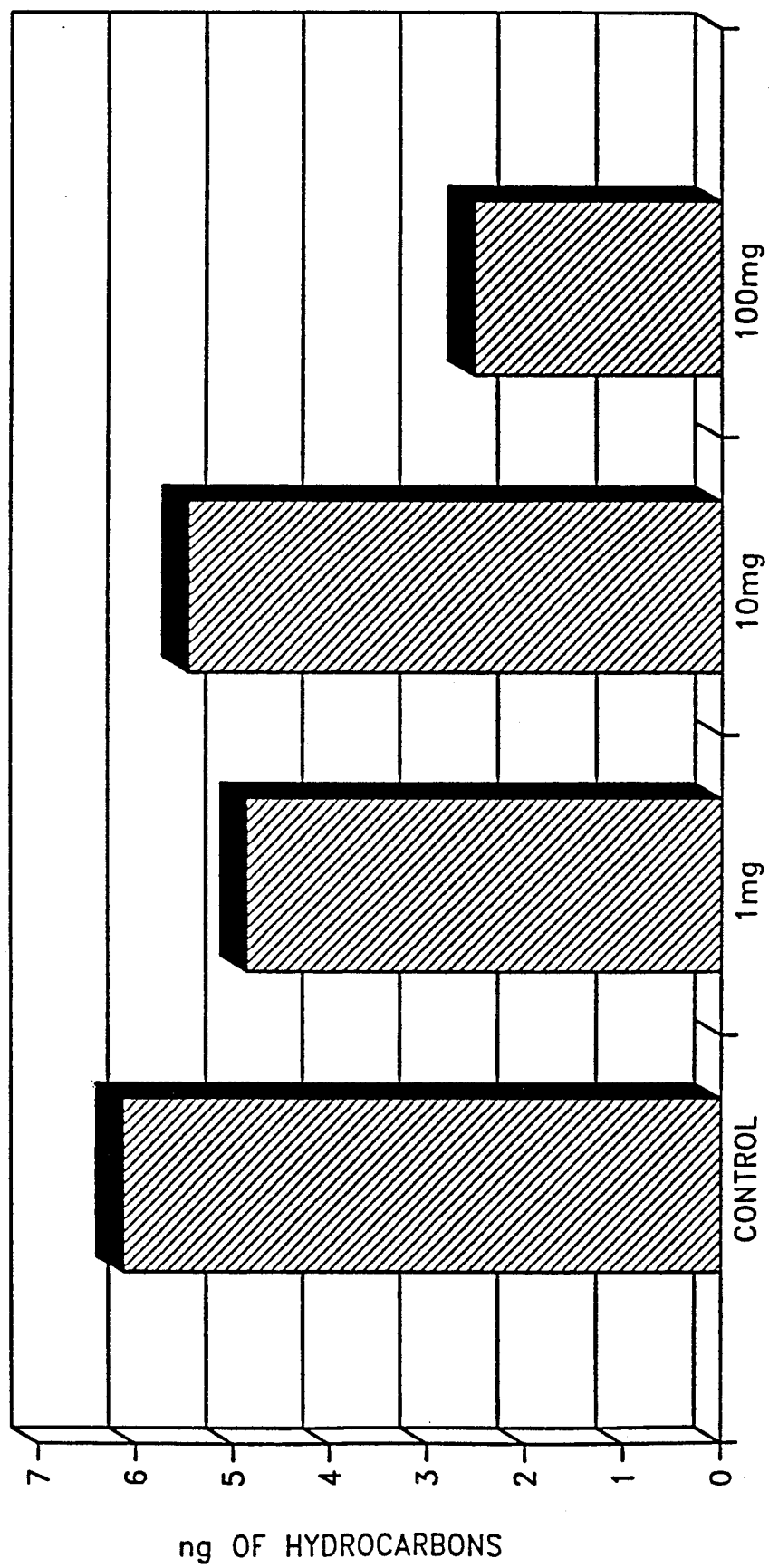
FIG. 4 is a bar graph showing the effect of increasing amounts of ORC on the concentration of $C_{14}$ hydrocarbons in the soil sample.

FIG. 4 is a bar graph showing the effect of increasing amounts of ORC on the concentration of $C_{14}$ hydrocarbons in the soil sample (expressed as mg of hydrocarbon). 100 mg of ORC added to each sample in the group produced a significant decrease in the amount of hydrocarbon present in the soil relative to controls.

Figure 5:
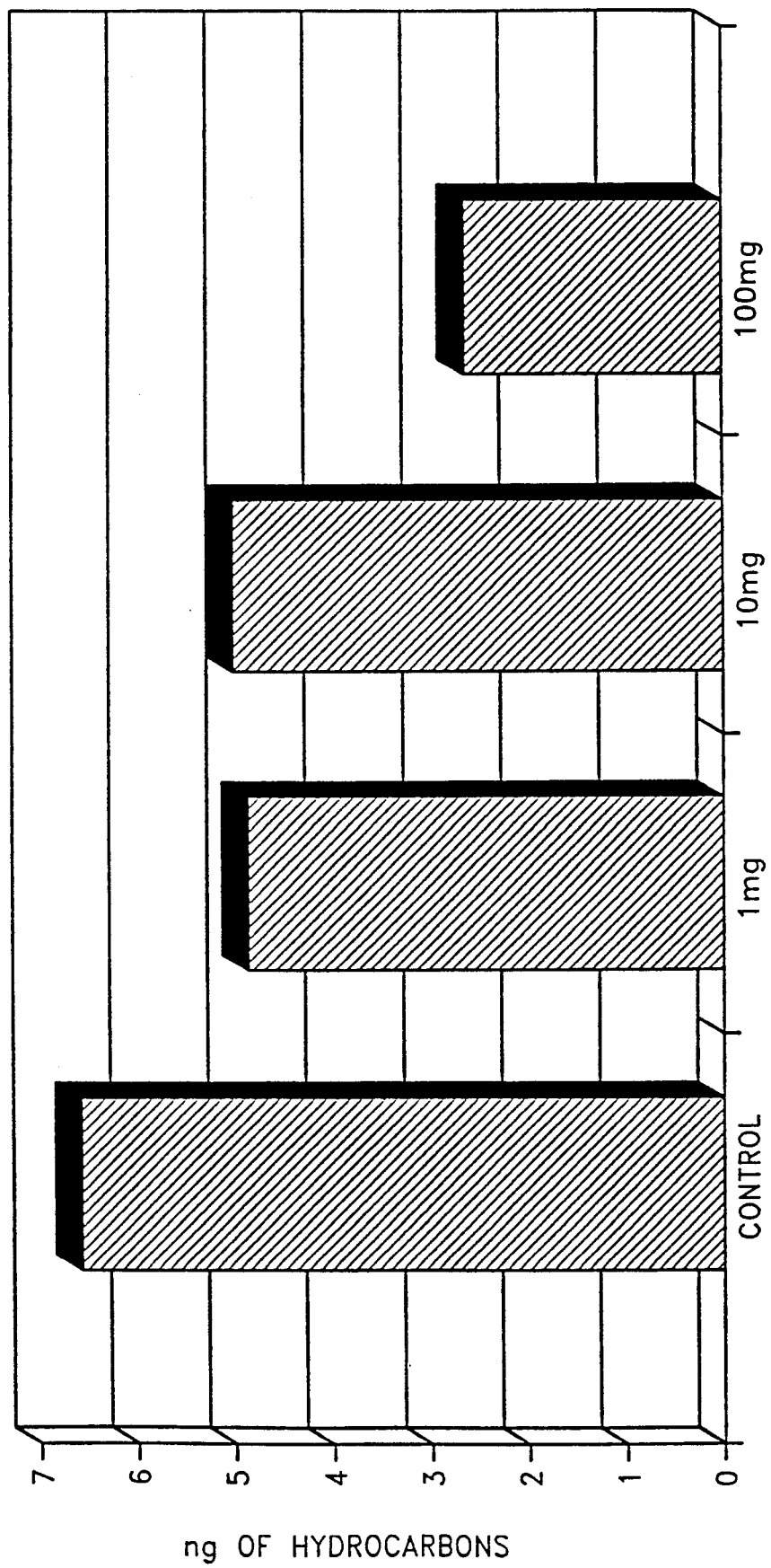
FIG. 5 is a bar graph showing the effect of increasing amounts of ORC on the concentration of $C_{15}$ hydrocarbons in the soil sample.

FIG. 5 is a bar graph showing the effect of increasing amounts of ORC on the concentration of $C_{15}$ hydrocarbons in the soil sample (expressed as mg of hydrocarbon). Results of this data group is similar to FIG. 4 above. 100 mg of ORC added to the soil samples produced a significant decrease in the amount of hydrocarbon present as compared with controls.

Figure 6:
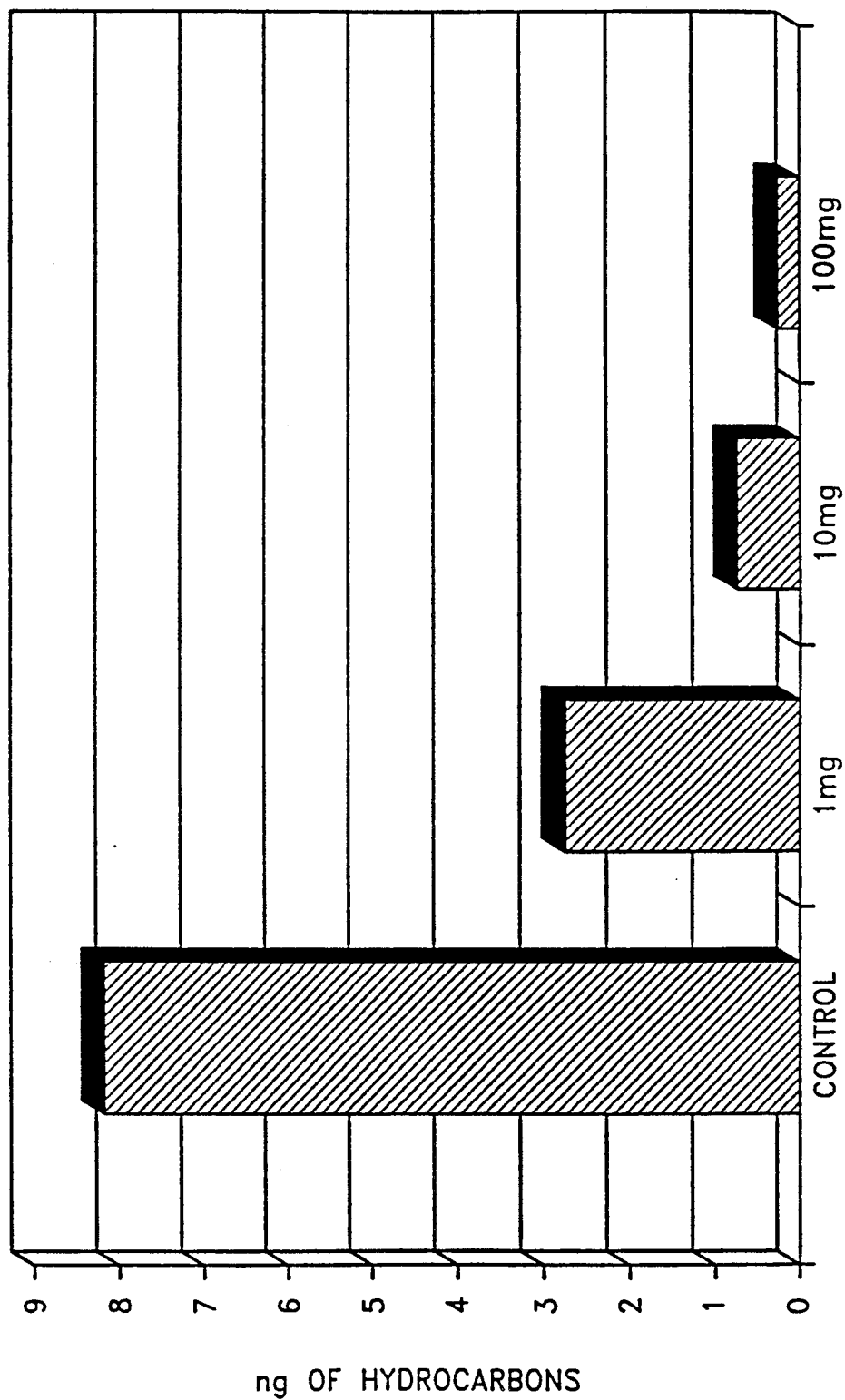
FIG. 6 is a bar graph showing the effect of increasing amounts of ORC on the concentration of $C_{16}$ hydrocarbons in the soil sample.
Figure 7:
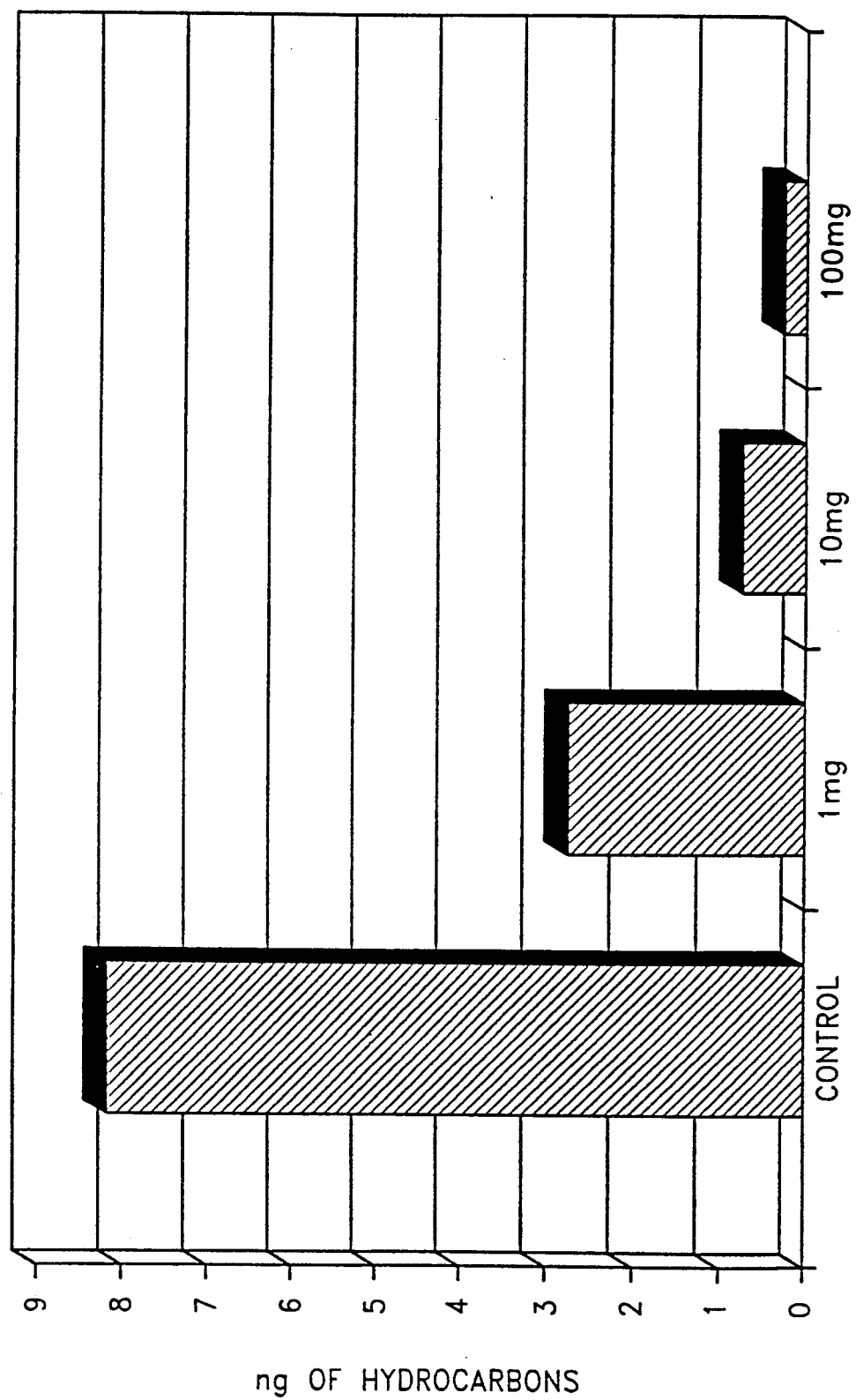
FIG. 7 is a bar graph showing the effect of increasing amounts of ORC on the concentration of $C_{17}$ hydrocarbons in the soil sample.

FIGS. 6 and 7 show the effect of increasing amounts of ORC on the concentration of $C_{16}$ and $C_{17}$ hydrocarbons respectively. Both graphs show that $C_{16}$ and $C_{17}$ hydrocarbon degradation increases with increasing concentrations of ORC.

FIGS. 4-7 thus illustrate the beneficial effect of ORC on microbial-mediated hydrocarbon degradation in soil under otherwise anaerobic conditions.

Results from these experiments indicate that microbial removal is enhanced in the presence of the ORC compound. Other mechanisms of oxidative removal of hydrocarbons are not believed able to function effectively using the low concentrations of oxidation compound and reduced temperatures described herein.

The above description discloses the best mode contemplated of carrying out the present invention. This invention is, however, susceptible to modifications in the methods discussed above. Consequently, it is not the intention to limit this invention to the particular embodiments disclosed. On the contrary, the intention is to cover all modifications and alternatives coming within the spirit and scope of the invention as generally expressed by the following claims.

We claim:

1. A method of treating media contaminated with pollutants of the type which are treatable by microorganisms in the media comprising:
   applying to the media a composition containing a metal peroxide intercalated with a source of simple phosphate ion selected from the group consisting of dihydrogen phosphate alkali metal salts, hydrogen phosphate alkali metal salts, urea phosphate, monoammonium phosphate, diammonium phosphate, and mixtures thereof,
   said composition being applied in an amount effective to substantially increase the pollutant-treating activity of the population of microorganisms in the media,
   said composition being intercalated with a source of simple phosphate by having been prepared by a method comprising:
   reacting a metal oxide, metal hydroxide or metal carbonate with an aqueous solution of hydrogen peroxide in the presence of said source of simple phosphate ion; and thereafter
   drying the product produced in the reacting step to remove the water therefrom and provide an intercalated composition.

2. The method of claim 1, wherein the amount of composition applied to the soil contains at least about 100 grams of compound per metric ton of soil to be treated.

3. The method of claim 1, wherein the compound releases to the soil at least about 100 milligrams of atomic oxygen per gram of compound.

4. The method of claim 1, wherein the composition further comprises a fertilizer.

5. The method of claim 1, wherein the composition further comprises a surfactant in an amount which is rapidly degradable and substantially non-toxic to plants and microorganisms.

6. The method of claim 5, wherein the surfactant is a monolaurate, monopalmitate, monostearate, or monooleate ester or sorbitol, or mixtures thereof, either with or without ethoxylation.

7. The method of claim 5, wherein the surfactant is present in an amount of from about 0.001 to 0.010 grams of surfactant per gram of final product.

8. The method of claim 7, wherein the surfactant is selected from the group consisting of:
   (a) long chain alcohol ethoxylate sulfates of the formula $RO-(C_2CH_2O)-_n SO_3Na$ where R is about $C_{12}$ to $C_{18}$ and n is no greater than about 9 to 10;
   (b) long chain acyl taurides of the formula $RCON(CH_3)C_2H_4SO_3Na$ where R is about $C_{14}$ to $C_{20}$; and (c) long chain ethoxylated alcohols of the formula $RO-(CH_2CH_2O)-_n H$ where R is about $C_{14}$ to $C_{20}$ and n is no greater than about 9 to 10.

9. The method of claim 1, wherein the composition comprises:
   nitrogen, expressed as atomic nitrogen, in an amount ranging from 1 to 35 weight percent;
   phosphorus, expressed as phosphorus pentoxide, in an amount ranging from 1 to 35 weight percent;
   potassium, expressed as potassium oxide, in an amount ranging from 1 to 35 percent; and
   calcium peroxide, magnesium peroxide, potassium peroxide, or mixtures thereof, in an amount ranging from 5 to 90 weight percent.

10. The method of claim 1 or 9, including a trace amount of metal selected from the group consisting of zinc, copper, molybdenum, boron, selenium, cobalt, aluminum, manganese, iron, and nickel.

11. The method of claim 10, wherein the trace amount of metal is less than 1000 parts per million of the compound.

12. The method of claim 1, wherein said metal peroxide is selected from the group consisting of magnesium peroxide, calcium peroxide and mixtures thereof.

13. The method of claim 12, wherein said metal peroxide consists essentially of magnesium peroxide.

14. A composition for enhancement of in situ biological treatment of waste materials from a portion of earth containing such materials, comprising:
   a metal peroxide selected from the group consisting of calcium peroxide or magnesium peroxide, intercalated with a source of simple phosphate for slowing the release of oxygen from said metal peroxide,
   said metal peroxide being intercalated with a source of simple phosphate selected from the group consisting of dihydrogen phosphate alkali metal salts, hydrogen phosphate alkali metal salts, urea phosphate, monoammonium phosphate, diammonium phosphate, and mixtures thereof, by being present in a composition having been prepared by a method comprising:
   reacting a metal oxide, metal hydroxide or metal carbonate with an aqueous solution of hydrogen peroxide in the presence of said source of simple phosphate ion; and thereafter
   drying the product produced in the reacting step to remove the water therefrom and provide an intercalated composition.

15. A composition as in claim 14, wherein said peroxide comprises magnesium peroxide.

16. A composition as in claim 15, wherein said composition has a mesh size of about 200 or less.

17. A method of delivering oxygen in a time-release fashion to a treatment site below a media surface, comprising the steps of:
   carrying oxygen to a first depth below the surface in the form of a composition containing a metal peroxide, said composition having a granulation mix of no larger than about 200 mesh;
   liberating oxygen from said metal peroxide in a time-release fashion by controlling the decomposition of said peroxide in said composition through intercalation in said composition of a source of phosphate ion selected from the group consisting of dihydrogen phosphate alkali metal salts, hydrogen phosphate alkali metal salts, urea phosphate, monoammonium phosphate, diammonium phosphate, and mixtures thereof, said composition being intercalated with a source of simple phosphate by having been prepared by a method comprising:

reacting a metal oxide, metal hydroxide or metal carbonate with an aqueous solution of hydrogen peroxide in the presence of said source of simple phosphate ion; and thereafter drying the product produced in the reacting step to remove the water therefrom and provide an intercalated composition; and carrying said liberated oxygen to a further second depth below the surface by use of a surfactant.

18. A method as in claim 17, wherein said surfactant and said metal peroxide are intermixed before application to the surface of the ground.

19. The method of either claim 1 or claim 17, wherein said media comprises soil.

20. A method of enhancing the biological treatment of undesired material of the type capable of biological degradation by microorganisms of the type having an aerobic metabolic pathway in a media containing such undesired material and containing such microorganisms, said media of the type having a first reduction oxidation potential, comprising the steps of:

identifying a site containing said media containing such undesired material and containing such microorganisms;

consistently increasing the redox potential of said media for at least two days by applying to the media a composition comprising a metal peroxide intercalated with a source of simple phosphate ion selected from the group consisting of dihydrogen phosphate alkali metal salts, hydrogen phosphate alkali metal salts, urea phosphate, monoammonium phosphate, diammonium phosphate, and mixtures thereof, in an amount which consistently provides an increase in the reduction oxidation potential of said media for at least two days to a second, higher reduction oxidation potential, thereby consistently providing a more favorable environment for the biological treatment of the undesired material for at least two days by consistently enhancing the aerobic metabolic pathway of said microorganisms and thereby increasing the degradation of said undesired material by said microorganisms, said composition being intercalated with a source of simple phosphate by having been prepared by a method comprising:

reacting a metal oxide, metal hydroxide or metal carbonate with an aqueous solution of hydrogen peroxide in the presence of said source of simple phosphate ion; and drying the product produced in the reacting step to remove the water therefrom and provide an intercalated composition.

21. The method of claim 20, wherein said first reduction oxidation potential is below zero, and wherein a sufficient amount of said peroxide is delivered to change the reduction oxidation potential of the media from below zero to above zero.

22. The method of claim 20, wherein the peroxide is selected from the group consisting of calcium peroxide, potassium peroxide and magnesium peroxide or mixture thereof.

23. The method of claim 22, wherein the composition further comprises a surfactant which is degradable into generally nontoxic byproducts.

24. The method of claim 23, wherein the surfactant is present in an amount of from 0.05 to 2.0 weight percent of the weight of the peroxide.

25. The method of claim 20, wherein the source of simple phosphate ion is present in the amount of from about 0.03 to about 1.60 grams per gram of peroxide.

26. The method of claim 20, wherein said composition provides an increase in the reduction oxidation potential of said site over a time period of at least thirty days.

27. The method of claim 20, wherein said undesired material comprises a hydrocarbon.

28. The method of claim 27, wherein said hydrocarbon has at least fourteen carbon atoms.

29. A method of treating media contaminated with pollutants of the type which are treatable by microorganisms in the media comprising:

applying to the media a composition containing a metal peroxide intercalated with at least one source of simple phosphate ion selected from the group consisting of salts of phosphorus in which for each phosphorus containing salt the negatively charted portion of the compound contains only one atom of phosphorus, said composition being applied in an amount effective to substantially increase the pollutant-treating activity of the population of microorganisms in the media, said composition being intercalated with a source of simple phosphate by having been prepared by a method comprising:

reacting a metal oxide, metal hydroxide or metal carbonate with an aqueous solution of hydrogen peroxide in the presence of said source of simple phosphate ion; and thereafter drying the product produced in the reacting step to remove the water therefrom and provide an intercalated composition.

30. A composition for enhancement of in situ biological treatment of waste materials from a portion of earth containing such materials, comprising:

a metal peroxide selected from the group consisting of calcium peroxide or magnesium peroxide, intercalated with a source of simple phosphate for slowing the release of oxygen from said metal peroxide, said metal peroxide being intercalated with a source of at least one simple phosphate selected from the group consisting of salts of phosphorus in which for each phosphorus containing salt the negatively charged portion of the compound contains only one atom of phosphorus, by being present in a composition having been prepared by a method comprising:

reacting a metal oxide, metal hydroxide or metal carbonate with an aqueous solution of hydrogen peroxide in the presence of said source of simple phosphate ion; and thereafter drying the product produced in the reacting step to remove the water therefrom and provide an intercalated composition.

31. A method of delivering oxygen in a time-release fashion to a treatment site below a media surface, comprising the steps of:

carrying oxygen to a first depth below the surface in the form of a composition containing a metal peroxide, said composition having a granulation mix of no larger than about 200 mesh;

liberating oxygen from said metal peroxide in a time-release fashion by controlling the decomposition of said peroxide in said composition through intercalation in said composition of at least one source of phosphate ion selected from the group consisting of salts of phosphorus in which for each phosphorus containing salt the negatively charged portion of the compound contains only one atom of phosphorus, said composition being intercalated with a source of simple phosphate by having been prepared by a method comprising:

reacting a metal oxide, metal hydroxide or metal carbonate with an aqueous solution of hydrogen peroxide in the presence of said source of simple phosphate ion; and thereafter drying the product produced in the reacting step to remove the water therefrom and provide an intercalated composition; and carrying said liberated oxygen to a further second depth below the surface by use of a surfactant.

32. A method of enhancing the biological treatment of undesired material of the type capable of biological degradation by microorganisms of the type having an aerobic metabolic pathway in a media containing such undesired material and containing such microorganisms, said media of the type having a first reduction oxidation potential, comprising the steps of:

identifying a site containing said media containing such undesired material and containing such microorganisms;

consistently increasing the redox potential of said media for at least two days by applying to the media a composition comprising a metal peroxide intercalated with at least one source of simple phosphate ion selected from the group consisting of salts of phosphorus in which for each phosphorus containing salt the negatively charged portion of the compound contains only one atom of phosphorus, in an amount which consistently provides an increase in the reduction oxidation potential of said media for at least two days to a second, higher reduction oxidation potential, thereby consistently providing a more favorable environment for the biological treatment of the undesired material for at least two days by consistently enhancing the aerobic metabolic pathway of said microorganisms and thereby increasing the degradation of said undesired material by said microorganisms, said composition being intercalated with a source of simple phosphate by having been prepared by a method comprising:

reacting a metal oxide, metal hydroxide or metal carbonate with an aqueous solution of hydrogen peroxide in the presence of said source of simple phosphate ion; and drying the product produced in the reacting step to remove the water therefrom and provide an intercalated composition.

33. A method of making a dried peroxide composition comprising:

(A) forming a metal peroxide by reacting a metal oxide, a metal hydroxide, or a metal carbonate with an aqueous solution of hydrogen peroxide in the presence of a source of phosphate ion selected from the group consisting of potassium dihydrogen phosphate, potassium hydrogen phosphate, urea phosphate, monoammonium phosphate, diammonium phosphate and a mixture thereof; and thereafter, (B) drying the product produced from step (A) to remove the water therefrom and to provide a granular composition.

34. A method of making a dried peroxide composition comprising:

(A) forming magnesium peroxide by reacting magnesium oxide, magnesium hydroxide, or magnesium carbonate with an aqueous solution of hydrogen peroxide in the presence of a source of phosphate ion selected from the group consisting of potassium dihydrogen phosphate, potassium hydrogen phosphate, urea phosphate, monoammonium phosphate, diammonium phosphate and a mixture thereof; and thereafter, (B) drying the magnesium peroxide so produced from step (A) to remove the water therefrom and to provide a granular composition.

* * * * *